(12) United States Patent
Sakakibara et al.

(10) Patent No.: US 6,564,227 B2
(45) Date of Patent: May 13, 2003

(54) CUSTOMER SUPPORT SYSTEM

(75) Inventors: Yutaka Sakakibara, Kanagawa (JP); Hiroshi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 244 days.

(21) Appl. No.: 09/749,083

(22) Filed: Dec. 27, 2000

(65) Prior Publication Data
US 2001/0018691 A1 Aug. 30, 2001

(30) Foreign Application Priority Data

Dec. 28, 1999 (JP) .......................... 11-375652
Dec. 12, 2000 (JP) ........................ 2000-377668

(51) Int. Cl.[7] ............................................. G06F 17/30
(52) U.S. Cl. .................. 707/104.1; 707/10; 707/102; 707/103 R
(58) Field of Search ............................... 707/104.1, 102, 707/10, 103 R

(56) References Cited

U.S. PATENT DOCUMENTS

| | | | |
|---|---|---|---|
| 5,214,772 A | | 5/1993 | Weinberger et al. |
| 5,301,314 A | * | 4/1994 | Gifford et al. .................. 707/1 |
| 5,386,271 A | | 1/1995 | Maekawa et al. |
| 5,678,002 A | * | 10/1997 | Fawcett et al. ......... 395/183.01 |
| 5,778,184 A | * | 7/1998 | Brownmiller et al. . 395/200.54 |
| 5,854,828 A | * | 12/1998 | Kocis et al. .............. 379/93.31 |
| 5,872,911 A | * | 2/1999 | Berg ...................... 395/183.19 |
| 5,887,216 A | | 3/1999 | Motoyama ..................... 399/8 |
| 6,141,507 A | | 10/2000 | Sawada ......................... 399/8 |
| 6,202,210 B1 | * | 3/2001 | Ludtke ........................ 725/20 |
| 6,240,420 B1 | * | 5/2001 | Lee ............................. 707/102 |
| 6,252,852 B1 | * | 6/2001 | Rowles et al. .............. 370/242 |
| 2001/0027470 A1 | * | 10/2001 | Ulmer et al. ................ 709/203 |
| 2002/0022969 A1 | * | 2/2002 | Berg et al. ...................... 705/1 |
| 2002/0039352 A1 | * | 4/2002 | El-Fekih et al. ............ 370/252 |

FOREIGN PATENT DOCUMENTS

EP   0 715 221 A1   11/1995

* cited by examiner

*Primary Examiner*—Frantz Coby
(74) *Attorney, Agent, or Firm*—Morrison & Foerster LLP

(57) ABSTRACT

A customer support system uses information concerning device located at customer and supports the customer. A customer support center collects customer information using a communication line, and stores or transferring the information. Customer information systems connected with the customer support center via a communication line, use the information of the customer support center, and support the customer. The customer support center comprises a collector for collecting and distributing usage information and quality information of the device, and a memory storing the usage information and quality information of the device as it is or after modifying it. The customer information systems use the usage information and quality information of the device collected by the customer support center, and support the customers.

52 Claims, 9 Drawing Sheets

CUSTOMER SUPPORT SYSTEM

BACKGROUND OF THE INVENTION

1. Field of the Invention

The present invention generally relates to a customer support system. In particular, the present invention relates to a customer support system, a customer support method, a customer support center, and a customer information system for supporting a customer by effectively using data from a device that is in the customer's possession.

2. Description of the Related Art

It is known to remotely monitor the state of a device located at a customer and take necessary measures for such device. However, such known systems depend upon the collection of certain specified information. Therefore, the purposes for which the collected information may be used have been limited.

For example, a known system remotely monitors the amount (or time) that a device has been used, and collects a charge according to the amount of usage. Further, there are known systems for remotely monitoring the quality or the state of a device.

However, it may not be possible to sufficiently support customers merely by obtaining information regarding the status or usage of a device.

For example, it is not possible to know the complete state of a device only through usage or quality information. If it is not possible to know the complete state of a device, then it is not possible to fully perform maintenance and management of the device. Thus, it is not possible to fully support the customer.

In many cases, a microcomputer may be set in a device located at a customer, and the information-orientation of the device itself may be processed. However, the present applicants are unaware of any one system in which information generated from the device is effectively used and used equally by customers, device suppliers, device maintenance staff and device managers.

SUMMARY OF THE INVENTION

The present invention has been devised in consideration of the above-mentioned problems. An object of the present invention is to obtain a wide range of information of a device located at a customer, and to use the usage information and the quality information of the device to give various facilities to the customer and to positively support the customer.

An exemplary customer support system according to the present invention using information concerning at least one device (for example, terminals $1_1$ through $1_N$, shown in FIG. 1; a device shown in FIG. 6) located at a customer, and supporting the customer, may comprise:

a customer support center (for example, a customer support center 11, shown in FIG. 1; the same shown in FIG. 3) collecting customer information using a communication line (for example, a network 13 shown in FIG. 1; a network 10 shown in FIG. 2), and storing or transferring the thus-collected information; and at least one customer information system (for example, the customer information systems $12_1$ through $12_N$ shown in FIG. 1; the same shown in each of FIGS. 4 and 5) connected with the customer support center via a communication line (for example, a network 10 shown in each of FIGS. 1 and 2), using the information from the customer support center, and supporting the customer, wherein the customer support center comprises a collection and delivery program for collecting and distributing usage information and quality information of the at least one device, and a device information storing program for storing the usage information and quality information of the at least one device as it is or after modifying it; and the at least one customer information system uses the usage information and quality information of the at least one device collected by the customer support center, and supports the customer.

Thereby, the customer support center collects the usage information indicating an amount to which the device has been used and the quality information indicating the quality of the device from the at least one device located at the customer, and distributes the same information. The at least one customer information system uses the same information for supporting the customer. Thereby, various conveniences/advantages can be provided to the customer, and positive supporting of the customer can be achieved.

The quality information may comprise alarm information which indicates that the device is in a condition such that no fault has occurred but maintenance is needed; and the usage information may comprise information as to how many times the device is used in a case where the device comprises an image processing device.

Thereby, the fault information, alarm information and information as to how many times the device is used are used. Accordingly, it is possible to support the customer appropriately in each situation.

The customer support center, when receiving the fault information, may report this matter to the customer information system in charge of maintenance and/or management of the device. Also, the customer support center may obtain the quality information of the device which has the fault, after a predetermined time has elapsed since the fault information was received, and may comprise a canceling part for canceling the fault information when it is determined from the quality information that the device operates normally.

Thereby, when receiving the fault information, the customer support center determines whether the relevant device has been restored after the predetermined time has elapsed, and, when the device has been restored, determines that it is not necessary to take care of the customer and cancels the fault information. Accordingly, it is possible to effectively deal with the fault information.

The customer support center may comprise a discarding part which discards the fault information or alarm information when it is determined from a condition of the device that the device is in a condition such that no fault or no alarm occurs, when the fault information or alarm information is received.

Thereby, by discarding the fault information when the relevant device is in such a condition that a fault or alarm does not occur, it is possible to avoid useless dealing with the fault information or alarm information.

The customer support center, when receiving the fault information, may not regard it as the fault information when it is not necessary to deal with it.

It is thereby possible to avoid useless dealing with the fault information.

The customer support center may comprise a filter part for deleting, from the fault information, information unnecessary for restoring the device from the fault.

It is thereby possible to perform data processing of the fault information efficiently.

Further, because no unnecessary information is included, it is possible to transmit and store the data efficiently.

The customer support center may comprise a prediction part which predicts a future fault or bad condition or deficiency using the fault information which is not regarded as the fault information.

It is thereby possible to effectively use the fault information which is not regarded as the fault information for predicting a future fault or bad condition or deficiency.

The customer support center may comprise a prediction part which predicts a future fault or bad condition or deficiency using the information which is deleted from the fault information by the filter part.

It is thereby possible to effectively use the information which is deleted from the fault information by the filter part for predicting a future fault or bad condition or deficiency.

The customer support center may regard the alarm information as the fault information when it is received from the same device successively.

It is thereby possible to restore from an alarm which is felt by the customer as an actual fault.

The customer support center may comprise an information acquisition setting part for specifying the target device or a time, and obtaining information regarding the use of the target device.

It is thereby possible to obtain necessary information as the need arises.

The customer support center may comprise a supply instructing part for using the usage information or expendable-supply used information for supplying expendable supplies to the device. The supply instructing part may function to report necessary information to the customer information system in charge of supply of expendable supplies.

It is thereby possible to supply expendable supplies rapidly and appropriately.

The quality information may comprise supply instruction information indicating that supply of expendable supplies is needed. A supply box may be deployed at the customer at which the device is located. The supply box may comprise a transmitting part which catches a custody state of expendable supplies for each item of the expendable supplies, and, when supply of the expendable supplies is needed, transmits the supply instruction information to the customer information system.

It is thereby possible to supply expendable supplies rapidly and appropriately by the customer information system.

The customer support center may comprise a transferring part which, when the alarm information is received, transfers part of the alarm information to the customer information system in charge of maintenance and/or management of the device.

It is thereby possible to deal with the alarm information rapidly and appropriately by the customer information system in charge of maintenance and/or management of the device.

The customer support center may comprise a transferring part which modifies the alarm information and transfers the modified alarm information to the customer information system in charge of maintenance and/or management of the device.

It is thereby possible to deal with the alarm information rapidly and appropriately by the customer information system in charge of maintenance and/or management of the device.

The customer support center may comprise a storage part for storing, for each device or for each customer, information received by the customer support center and information obtained after being modified by the customer support center.

Thereby, the information stored in the storage part can be effectively used by the customer support center and the at least one customer information system as the need arises.

The customer information system in charge of maintenance and/or management of the device, when receiving the fault information from the customer support center, may examine the state of the device located at the customer.

The customer information system in charge of maintenance and/or management of the device, after confirming based on the quality information of the device located at the customer that the device has a fault, may provide instructions to repair the device.

It is thereby possible to avoid useless dealing with the fault information.

The customer information system in charge of maintenance and/or management of the device may manage progress of the state from the reception of the fault information to the restoration from the fault.

It is thereby possible to know the state of repairing from the fault immediately at any time, and to proceed with dealing with the fault smoothly.

The customer information system in charge of maintenance and/or management of the device, when the customer information system in charge of supply of expendable supplies generates expendable-supply ordering information of ordering expendable supplies, may compare the state of the device located at the customer for which the ordering is made with the expendable-supply ordering information, and thus examines this information.

It is thereby possible to avoid erroneous ordering of expendable supplies.

The customer information system in charge of maintenance and/or management of the device, when information as to how many times the device has been used changes sharply, may determine whether this value is abnormal.

It is thereby possible to deal with the situation appropriately.

The customer information system may receive supply instructions from the customer support center, and supply of expendable supplies to the relevant device.

It is thereby possible to supply and manage expendable supplies most appropriately.

An exemplary customer supporting method according to the present invention may be used by at least one device (the terminals $1_1$ through $1_N$ shown in FIG. 1; the device shown in FIG. 6, for example) located at a customer, a customer support center (the customer support center 11 shown in FIG. 1; the same shown in FIG. 3, for example) collecting, distributing and/or modifying information of the at least one device using a communication line (the network 13 shown in FIG. 1; the network 10 shown in FIG. 2, for example) and at least one customer information system (the customer information systems $12_1$ through $12_N$ shown in FIG. 1; the same shown in each of FIGS. 4 and 5, for example) connected with the customer support center via a communication line (the network 10 shown in each of FIGS. 1 and 2, for example) and supporting the customer using the information collected and/or modified by the customer support center. The exemplary method may comprise the steps of:

a) the customer support center collecting and distributing usage information and quality information of the device;

b) the customer support center storing part or all of the usage information and quality information; and c) the customer information system using the usage information and quality information for supporting the customer.

Thereby, the customer support center collects and distributes the usage information and quality information of the device, and stores the same information. The customer information systems use the usage information and quality information. Thereby, various conveniences/advantages can be provided to the customers, and it is possible to supporting the customers positively.

The customer information system in charge of sales of the device may obtain classified-by-function information and clarified-by-size information of sales devices, and the usage information of the specific customers. The customer information system may provide information of the device suitable for the customer using the classified-by-function information, classified-by-size information of the sales devices, usage information of the specific customer, and a condition indicated by the specified customer (including the case where no condition is indicated by the customer).

When the information of the device is provided to the customer, the condition of the customer and a reason for the information provision may also be provided to the customer, simultaneously.

The customer information system may be used at a house of the customer through a remote terminal via a communication line.

Thereby, by preparing and providing information of devices suitable for the customers by using the classified-by-function information and classified-by-size information of sales device and the usage information of the specific customers, and the conditions indicated by the specific customers, it is possible to prepare a proposal for the customers rapidly and appropriately.

Further, because it is possible to prepare and show a proposal at a house of the customer using the remote terminal, it is possible to provide a timely proposal.

When receiving the fault information or alarm information from the customer support center, the customer information system in charge of maintenance and/or management of the device may change setting of the device located at the customer remotely so as to restore the device.

The customer information system in charge of maintenance and/or management of the device, when it is not possible to restore the device by changing setting of the device, may arrange a person for restoring the device without delay.

It is thereby possible to restore the device rapidly and appropriately.

The customer information system in charge of maintenance and/or management of the device may receive the usage information and quality information from the customer support center, and inspect the device by processing the received information.

It is thereby possible to prevent the device from having a fault. Thereby, the device can operate normally constantly.

The customer information system in charge of maintenance and/or management of the device may receive the usage information and quality information from the customer support center, and perform quality control of the maintenance and/or management works.

Thereby, in particular, by the quality information, it is possible to recognize the state of repairing of the device after dispatch of a service staff, and to perform quality control for the maintenance/management works.

The customer information system in charge of maintenance and/or management of the device may have a database of an artificial intelligence, and, based on knowledge data of the artificial intelligence and information obtained from the customer support center, determine whether the device of the customer has a fault.

It is thereby possible to repair the device from the fault rapidly and appropriately.

The customer information system in charge of supply of expendable supplies may receive the usage information from the customer support center, and supply and/or manage the expendable supplies.

Thereby, as a result of supply and management of expendable supplies being performed by the system different from the customer support center, the processing load borne by the customer support center can be reduced.

Further, because supply and management of expendable supplies is performed by the special system of supply and management of expendable supplies, it is possible to perform most appropriate supply and management of expendable supplies.

The customer information system in charge of management of expendable supplies may obtain information of stock of the expendable supplies preceding to a holiday by a predetermined time.

It is thereby possible to avoid such a situation that expendable supplies are short on the weekend.

The customer information system in charge of management of expendable supplies may obtain information of stock of the expendable supplies, and, when the stock is less than a predetermined amount, order the relevant expendable supplies on behalf of the customer as if they have been ordered by the customer.

It is thereby possible to order the expendable supplies rapidly.

The customer information system in charge of planning the device may receive the usage information and quality information from the customer support center, understand the actual situation as to how the device is used, and performs planning of the next device.

It is thereby possible to perform planning corresponding to the actual needs of the customers.

The customer information system in charge of design of the device may receive the usage information and quality information from the customer support center, obtain the quality information for each generation, for each model, and/or for each device, and improve the quality of the device.

It is thereby possible to catch tendency and frequency of faults for each model, and to perform improvement and/or design change on market products timely.

The customer information system in charge of manufacturing of the device may receive the usage information and quality information from the customer support center, understand the life of the device and durability of components, and make quality control in a manufacturing department be congruent with the actual situation.

It is thereby possible to make quality control in the manufacturing department be congruent with the actual situation.

Part or all of the works performed by the at least one customer information system may be performed by the customer support center.

It is thereby possible to dynamically distribute works in the customer support system.

An exemplary customer support center (for example, the customer support center 11 shown in FIG. 1; the same shown in FIG. 3) according to the present invention collecting, distributing and/or modifying information of at least one device located at a customer using a communication line, may comprise:

a collection and delivery part collecting and distributing usage information and quality information of the at least one device; and a device information storage part stores the usage information and quality information as it is or after modifying it, wherein the customer support center provides the collected and/or modified information to at least one customer information system connected to the center via a communication line. Thereby, the information concerning the at least one device is used for supporting the customer.

This customer support center is one suitable for any of the above-described customer support systems.

An exemplary customer information system (for example, any of the customer information systems $12_1$ through $12_N$ shown in FIG. 1; the same shown in any of FIGS. 4 and 5) according to the present invention connected via a communication line with at least one device located at a customer and a customer support center collecting, distributing and/or modifying information of the at least one device using a communication line, and using the information collected and/or modified by the customer support center for supporting the customer, may comprise:

a storage part storing information to be used for supporting the customer; and a processing part supporting the customer by using usage information and quality information of the at least one device, wherein the system uses the information concerning the at least one device for supporting the customer individually.

This customer information system is suitable for any of the above-described customer support systems.

An exemplary device (for example, any of the terminals $1_1$ through $1_N$ shown in FIG. 1; the same shown in FIG. 6) according to the present invention located at a customer in a customer support system comprising a customer support center collecting, distributing and/or modifying information of the device of customers using a communication line and at least one customer information system connected with the customer support center via a communication line and supporting the customers using the information collected and/or modified by the customer support center, may comprise:

an operation screen used for operating the device; and a state displaying button for displaying the state of the device, wherein when the button is pressed, the customer support center transmits information indicating the state of the device, and the state of the device is displayed on the operation screen.

It is thereby possible to easily obtain the state of the device.

Other objects and further features of the present invention will become more apparent from the following detailed description when read in conjunction with the accompanying drawings.

DETAILED DESCRIPTION OF THE PREFERRED EMBODIMENTS

Figure 1:
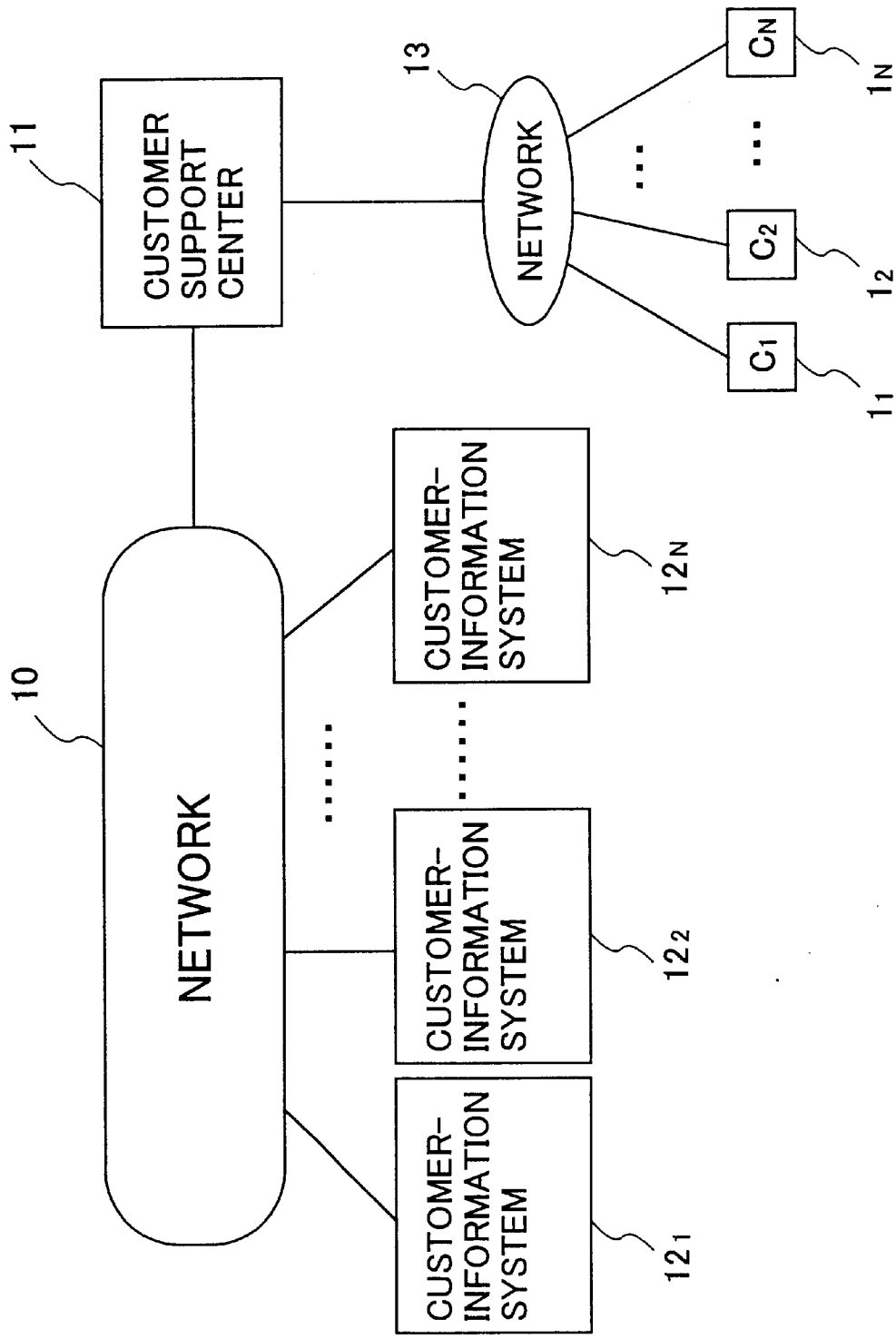
FIG. 1 illustrates one example of a customer support system according to the present invention.

FIG. 1 shows one example of a customer support system according to the present invention.

The system shown in FIG. 1 may include devices $1_1$ through $1_N$, a network 10, a customer support center 11, customer information systems $12_1$ through $12_N$, and a network 13.

The network 13 may be a public network. The devices $1_1$ through $1_N$ may be connected to the customer support center 11 directly via the public network 13.

The network 10 may be a leased-line network. The customer information systems $12_1$ through $12_N$ may be connected to the customer support center via the leased-line network 10.

The devices $1_1$ through $1_N$ located at the customer may include devices such as a printer, a copier, a facsimile machine, and so forth. The customer support center 11 collects usage information indicating the amount to which each device $1_1$ through $1_N$ located at the customer has been used and quality information indicating the qualities of these devices. Further, the customer support center 11 distributes the thus-collected information to the customer information systems $12_1$ through $12_N$ as it is or after modifying the information. The customer information systems $12_1$ through $12_N$ access a storage device of the customer support center 11. Thereby, they can obtain the usage information and quality information stored in the storage device arbitrarily.

Figure 2:
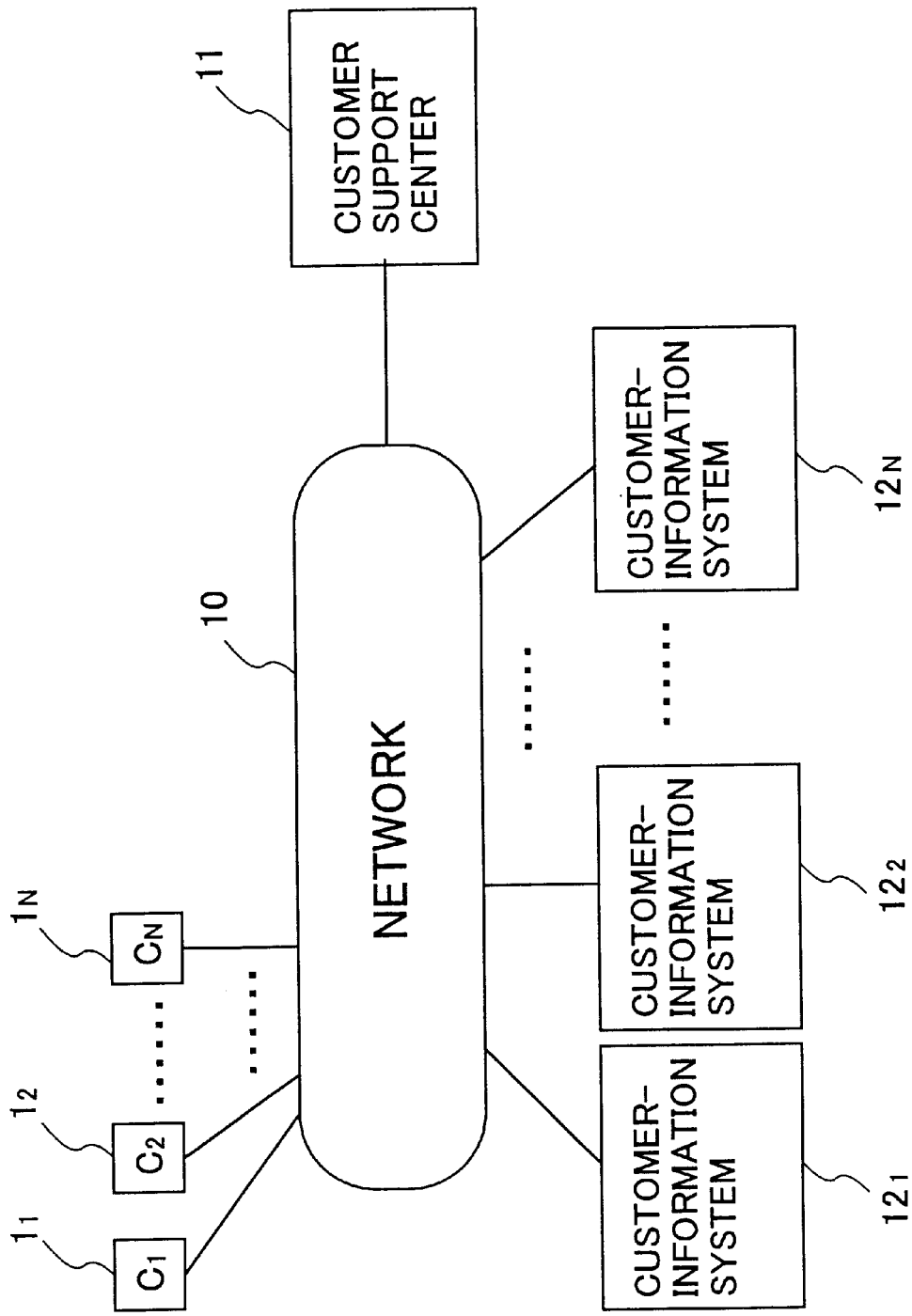
FIG. 2 illustrates another example of a customer support system according to the present invention.

As shown in FIG. 2, it is also possible to connect the devices $1_1$ through $1_N$ to the customer support center 11 via the leased-line network 10.

Description will now be made for the example shown in FIG. 1.

Figure 3:
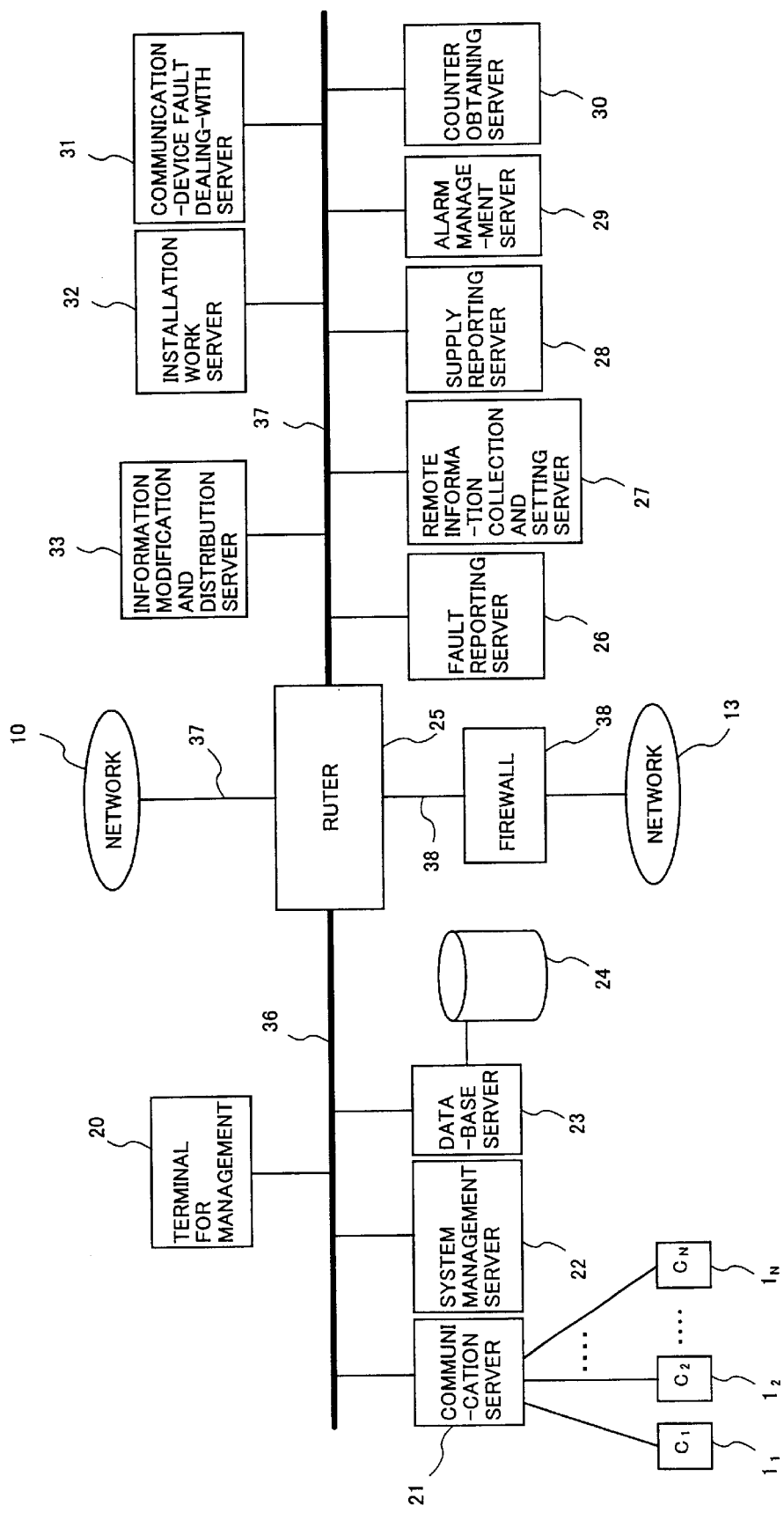
FIG. 3 illustrates one example of a customer support center according to the present invention.

FIG. 3 shows an example of the customer support center 11.

As shown in FIG. 3, the customer support center 11 may include a communication server 21, a system management server 22, a database server 23, a router 25, a fault reporting server 26, a remote information collecting and setting server 27, a supply reporting server 28, an alarm management server 29, a counter obtaining server 30, a communication-device fault dealing-with server 31, an installation work server 32, an information modification and distribution server 33, a LAN (Local Area Network) 36 and the networks 10 and 13.

The communication server 21, system management server 22, database server 23, database 24, fault reporting server 26, remote information collecting and setting server 27, supply reporting server 28, alarm management server 29, counter obtaining server 30, communication-device fault dealing-with server 31, installation work server 32, and information modification and distribution server 33 may be provided separately. However, it is also possible to combine some of them. Further, it is also possible to provide one server which may include the communication server 21, system management server 22, database server 23, database 24, fault reporting server 26, remote information collecting and setting server 27, supply reporting server 28, alarm management server 29, counter obtaining server 30, communication-device fault dealing-with server 31, installation work server 32, and information modification and distribution server 33.

The communication server 21 may communicate with the devices $1_1$ through $1_N$ directly or via a network. The communication server 21 receives, from the devices $1_1$ through $1_N$, the usage information indicating an amount to which each of the devices $1_1$ through $1_N$ has been used and quality information indicating the qualities of these devices.

The quality information may include alarm information indicating that some devices have troubles/faults, and that some devices do not have troubles/faults but need maintenance. The usage information may include a count value indicating the number of photocopying operations performed in a case where the device may be a copier.

The customer support center 11 remotely transmits setting data to the devices $1_1$ through $1_N$. Thereby, it can change the device which should transmit the information to the customer support center 11. Further, the customer support center 11 can also remotely set data which the device should transmit or the time at which the device should transmit the data.

The system management server 22 manages the entirety of the customer support center shown in FIG. 3.

The database server 23 manages the database 24. The database 24 stores therein data used by the fault reporting server 26, remote information collecting and setting server 27, supply reporting server 28, alarm management server 29, counter obtaining server 30, communication-device fault dealing-with server 31, installation work server 32, information modification and distribution server 33 and customer information systems $12_1$ through $12_N$ described below in detail.

For example, the database 24 may store therein a reporting history from target devices including model names and device numbers, and the setting changes to these devices, together with the contents of the reporting and/or setting, the state information of these device at the time, and the occurrence time and processing time.

Further, the database 24 may store therein the usage information and quality information received from a device located at the customer as it is or after modifying the information for the purpose of supporting the customers and so forth.

A fire wall 38 may be provided by a computer for providing security in connection with the network 13.

The fault reporting server 26 deals with fault information, and has the following functions:

(1) When receiving fault information, the fault reporting server 26 reports this information to the customer information systems which perform maintenance and/or management work for the device. It also obtains the quality information of the device which has the fault after a predetermined time has elapsed since receiving the fault information. It cancels the fault information when it can be determined from the quality information that this device is operating normally (this corresponds to the processing of a 'fault-information canceling program 101' described later).

There may be a case where a customer deals with a fault and repairs the device by himself or herself immediately when the fault occurs. In such a case, it is not necessary for the system to deal with the fault. Accordingly, the server confirms, after a predetermined time has elapsed (for example, a predetermined time has elapsed on a clock of the fault reporting server 26), whether the device has been repaired. When it is confirmed, the server determines that no measures should be taken for the customer and cancels the fault information.

However, when it is not confirmed that the device has been repaired, after confirming whether the device has been repaired after the predetermined time has elapsed, then the server determines that some measures should be taken for the customer. It reports this matter to the customer information system, which deals with the maintenance and/or management of the device.

It is thereby possible to deal with the fault information effectively.

(2) When the fault reporting server 26 receives fault information or alarm information but in a condition in which neither a fault nor an alarm occurs, the fault reporting server 26 discards the received fault information or alarm information (this corresponds to processing of a 'fault information/alarm information discarding program 102' described later).

For example, in a case of reporting in a condition other than a condition predetermined to be a bad condition or deficiency of a device, the fault reporting server 26 determines this matter, from the model name thereof and/or type of the reporting, and erases the received fault information or alarm information.

It is thereby possible to eliminate unnecessary responses to fault information or alarm information.

(3) When receiving fault information, but it is not necessary to deal with the fault information, the fault reporting server 26 does not treat the information as fault information (this corresponds to a 'fault information non-treating program 103' described later).

For example, when fault information is generated due to a fault from which it is possible to restore by turning on and off a power supply, the fault information is not treated as fault information.

It is thereby possible to omit useless dealing with fault information.

(4) Information which is not necessary for restoring from a fault may be deleted from fault information (this corresponds to processing of a 'filtering program 104' described later).

Fault information from the device may include information concerning the device. Accordingly, unnecessary information determined from a standpoint of restoring from a fault may be deleted. The remaining information is transmitted to the subsequent system. For example, i) device condition information for paper jam which is not necessary for dealing with fault information of image processing may be deleted;

ii) fault information may be deleted when the fault information is one from the same device for which a service staff has already been dispatched; and iii) a plurality of pieces of fault information are integrated into one piece when these pieces of fault information from the same device have been received successively.

It is thereby possible to perform data processing of fault information efficiently. Further, because unnecessary information is not included, it is possible to perform data transmission and data storage efficiently.

(5) A possible fault or bad condition or deficiency is predicted from information which is not treated as fault information, or information which may be deleted by the filtering program 104 from fault information because it is unnecessary as mentioned above (this corresponds to processing of a 'fault prediction program 105' described later).

For example, information which is not treated as fault information or information deleted by the filtering program 104 from fault information because it is unnecessary is modified into fault prediction information (at daily intervals, for example). It is then reported to the customer information system which is in charge of maintenance and/or management of the device. The information which is not treated as fault information or information deleted by the filtering program 104 from fault information because it is unnecessary may be deleted from the database 24.

Such information which is not treated as fault information or information deleted by the filtering program 104 from fault information because it is unnecessary is not necessarily the sort of information which needs urgency. However, such information can be used for predicting a fault. Accordingly, information which is not treated as fault information or information deleted by the filtering program 104 from fault information because it is unnecessary can be effectively used, and a future fault or bad condition or deficiency can be predicted therefrom.

(6) When alarm information is received from the same device successively, it is determined that fault information is received (this corresponds to processing of a 'regarding fault information program 106' described later).

Alarm information itself is not fault information and not a sort of information which needs urgency. However, a device which generates alarm information successively may have a fault in near future. Accordingly, in such a case, it is determined that fault information has been received, and necessary measures are taken.

(7) Using alarm information, a future need of dealing with a customer is predicted (this corresponds to the 'fault prediction program 105').

Alarm information itself is not fault information and not a sort of information which needs urgency. However, by considering some pieces of alarm information overall, it is possible to predict a future fault.

For example, when paper jam occurs frequently at a same position, a fault determination is made by comparing a durability (the number of sheets) of paper feeding rollers at the position on design with the actual number of sheets fed by the rollers or change in actual time required for paper to move between the rollers of the device.

Figure 8:
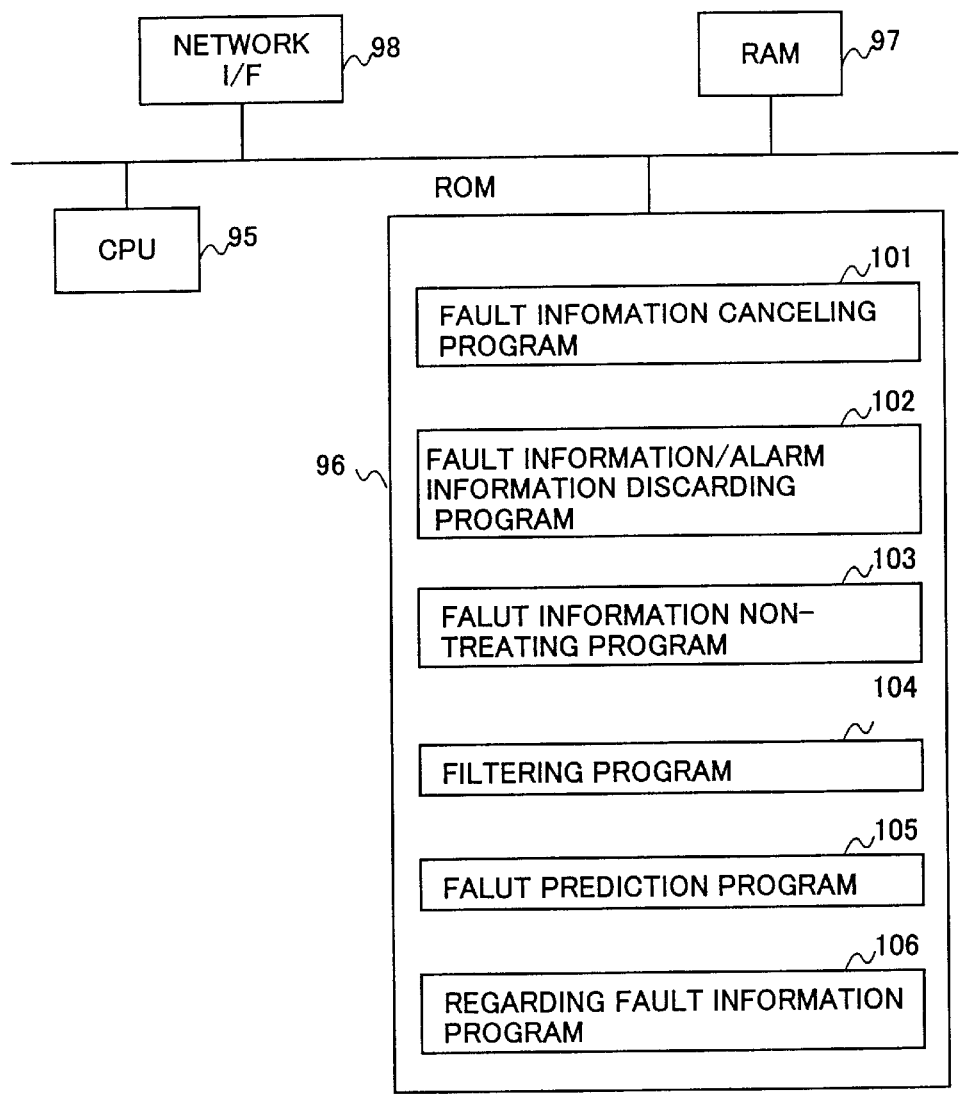
FIG. 8 illustrates one example of processing programs of a fault reporting server according to the present invention.

The fault reporting server 26 may include a CPU (Central Processing Unit) 95, a ROM (Read Only Memory) 96, RAM (Random Access Memory) 97, a network interface part 98, an input/output device and so fourth (as shown in FIG. 8). In the ROM 96, a fault reporting program is stored for achieving the above-described fault reporting functions of the fault reporting server 26.

The fault reporting program loaded in the ROM 96 includes processing programs shown in FIG. 8.

In accordance with the processing programs shown in FIG. 8, the CPU is controlled so as to perform the above-described functions. The processing will now be described simply.

In accordance with the fault information canceling program 101, the quality information of the device which has the fault is obtained after a predetermine time has elapsed since the fault information was received, and, the fault information is canceled when it can be determined from the quality information that this device operates normally.

In accordance with the fault information/alarm information discarding program 102, in a condition in which no fault or no alarm occurs, the received fault information or alarm information is discarded In accordance with the fault information non-treating program 103, when it is not necessary to deal with fault information, the given information is not treated as fault information In accordance with the filtering program 104, information unnecessary for restoration of a device from fault may be deleted from given fault information.

In accordance with the fault prediction program 105, fault information not regarded as fault information, information deleted by the filtering program 104, alarm information and so forth is used, and, thus, future faults or bad condition or deficiencies are predicted.

In accordance with the regarding fault information program 106, alarm information from the same device received successively is treated as fault information and is dealt with appropriately.

The remote information collecting and setting server 27 sets targets for which information is collected concerning the device located at the customers and times at which the information is collected, and has the following functions:

(1) Scheduling of Remote Operations

When a specified date-and-time is reached, a set device executes a set process.

(2) A Remote Control

When a specified date-and-time is reached, a line control is performed, and a remote process is performed on a set device.

The remote process may include a process concerning transmission of usage information and quality information of the device located at the customers, and a process concerning operations of these device themselves.

Thereby, by specifying a device and a time, it is possible to make setting such that information concerning use of the target device can be obtained.

The supply reporting server 28 is in charge of supply of expendable supplies, and has the following functions:

(1) Using usage information and expendable-supply used information, the supply reporting server 28 reports to the customer information system which is in charge of supply of expendable supplies that expendable supplies should be supplied for the device located at the customers.

(2) Supply boxes holding expendable supplies are deployed in the device located at the customers as will be described. For each item of the expendable supplies, a holding state is recognized by the respective supply box, and, when replenishment of expandable supplies is needed, information of supply instruction is sent to the customer support center. Receiving the information of supply instruction, the supply reporting server 28 reports this information to the customer information system which is in charge of supply of expendable supplies.

The alarm management server 29 manages alarms and has the following functions:

(1) For example, program or all of alarm information of paper jam transmitted from a device is transferred to the customer information system which is in charge of maintenance and/or management of the device.

(2) The alarm information is modified, and the thus-modified alarm information is transferred to the customer information system which is in charge of maintenance and/or management of the device.

The counter obtaining server 30 obtains the count number of the counter of a copier, according to setting made by the other customer information system. This operation of obtaining the count number is performed periodically or in response to instructions.

The communication-device fault dealing-with server 31 deals with faults in communication devices of the devices $1_1$ through $1_N$.

The installation work server 32 updates data (device numbers, communication numbers and so forth) fixed when the system is installed.

The information modification and distribution server 33 modifies usage information and quality information of the device, and distributes it to the domestic and foreign persons concerned, via the network 13.

Figure 4:
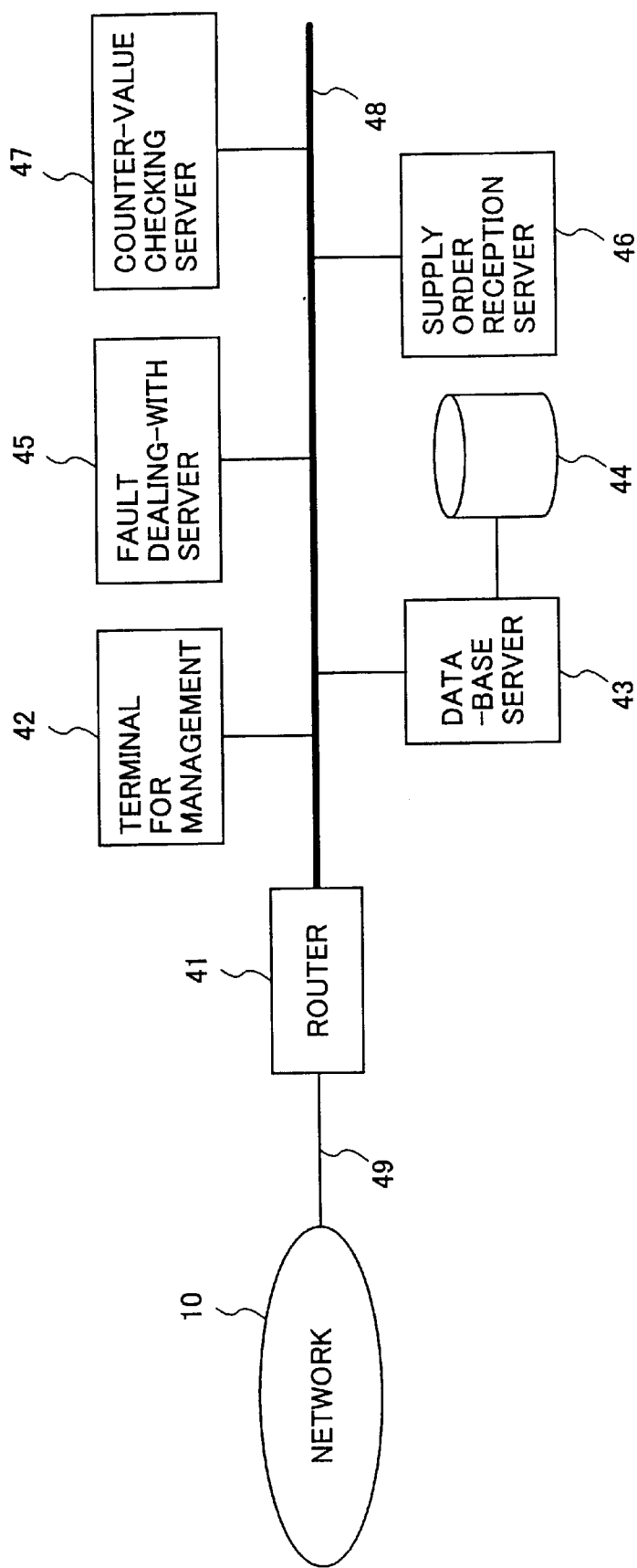
FIG. 4 illustrates one example of a customer information system in charge of maintenance and management of a device according to the present invention.

FIG. 4 shows the customer information system which is in charge of maintenance and/or management of the device.

As shown in FIG. 4, the system may include a communication router 41, a terminal for management 42, a database server 43, a database 44, a fault dealing-with server 45, a supply order reception server 46 and a counter-value checking server 47.

The communication server 41 acts as an interface between the network 10 and a bus 48. The terminal for management 42 is used for managing the customer information system which is in charge of maintenance and/or management of the device. The database server 43 manages the database 44. The database 44 stores therein information (including modified information) used by the customer information system which is in charge of maintenance and/or management of the device.

The fault dealing-with server 45 deals with faults of the device located at the customers, and has the following functions:

(1) When receiving fault information from the customer support center, the server 45 checks the state of the device located at the customer.

(2) Based on the quality information of the device located at the customer, the server 45 determines that this device has a fault, and, then, provides instructions for repairing this device.

(3) The server 45 manages the progress of situation until the device is restored from the fault since the server 45 received the fault information.

(4) When the customer information system which is in charge of supply of expandable supplies of the device generates expendable-supply ordering information ordering expendable supplies, the server 45 compares this information with the state of the device located at the customer for which supply of expendable supplies is required, and, thus, examines the expendable-supply ordering information.

The supply order reception server 46 receives a supply call which indicates lack of expendable supplies of the device from the device located at the customer, and performs transfer of this information to the customer information system which is in charge of supply of expendable supplies, and so forth.

The counter-value checking server 47 monitors the number of photocopying operations performed by the copier, and performs determination as to whether the value is abnormal when this value sharply increases, and so forth.

Figure 5:
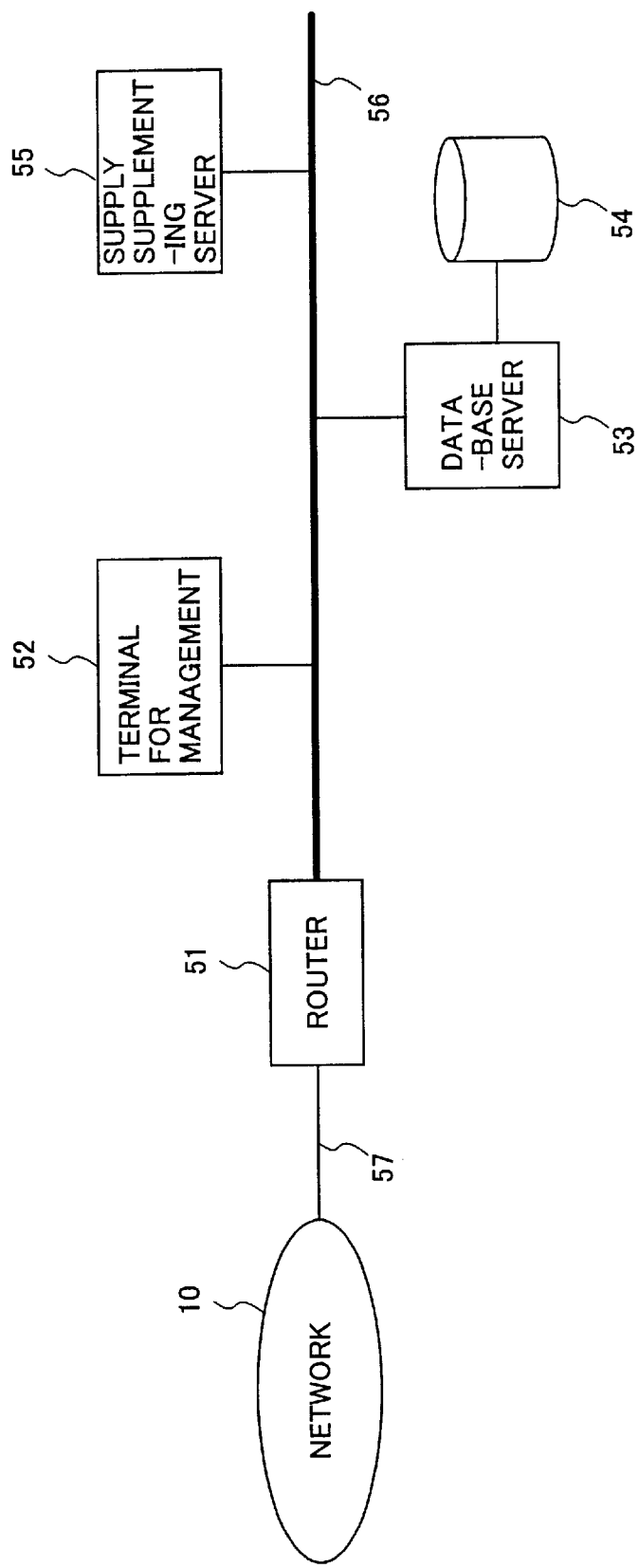
FIG. 5 illustrates one example of a customer information system in charge of the supply of expendable supplies for a device according to the present invention.

FIG. 5 shows the customer information system which is in charge of supply of expendable supplies (performing supply and/or management of expendable supplies as the need arises).

As shown in FIG. 5, the system may include a communication router 51, a terminal for management 52, a database server 53, a database 54 and a supply supplementing server 55.

The communication router 51 acts as an interface between the network 10 and a bus 56. The terminal for management 52 is used for managing the customer information system which is in charge of supply of expendable supplies.

The database server 53 manages the database 54. The database 54 stores therein information (including modified information) used by the customer information system which is in charge of supply of expendable supplies.

The supply supplementing server 55 deals with lack (or somewhat lack) of expendable supplies of the device located at the customer.

The customer information system in charge of supply of expendable supplies receives supply instructions from the customer supply center, and supplies the expendable supplies to the relevant device.

Holiday information (described later) is obtained based on calendar information set in the terminal for management 52. Holidays set may be those according to general calendar. However, it is preferable that holidays set are those of staff who are in charge of supply of expendable supplies.

Further, the calendar information may be set in the supply supplementing server 55. Further, periodic diagnosis of the device (described later) may be performed based on the calendar information.

With regard to the customer information systems, although they have been described above separately, it is possible that part of the functions of each customer information system or the like is distributed to another customer information system or the like.

For example, it is possible that the customer information system which is in charge of supply of expendable supplies of the device also has the function of the supply reporting server of the customer support center.

Figure 6:
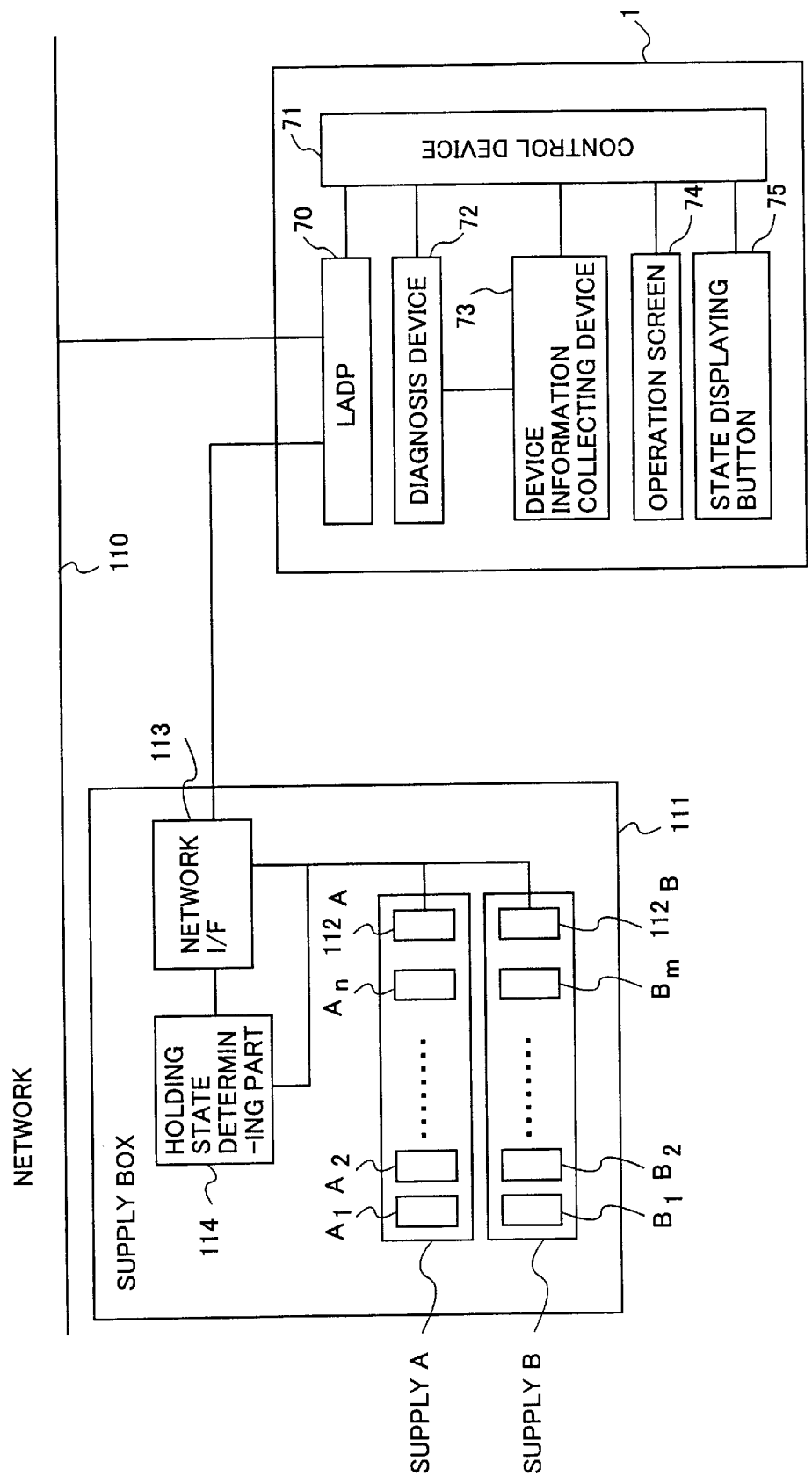
FIG. 6 illustrates one example of a system of a device located at a customer according to the present invention.

FIG. 6 shows one example of the device located at the customers.

Fault information indicating the device has a fault or alarm information indicating the device does not have a fault but needs maintenance and usage information is transmitted to the customer support center from the device located at the customers.

The customer support center uses the fault information, alarm information and usage information transmitted by the device of the customers, and supports the customers.

The devices 1 located at the customer may be a copier, a printer or the like, and has, in the body thereof, a line adapter 70, a control device 71, a device diagnosis device 72, a device information collecting device 73 and an operation screen 74, and has the supply box 111 connected thereto.

A general arrangement of devices provided in the device 1, fault information and so forth will now be described.

The control device 71 performs overall control of the device. The control device 71 performs not only control of the device itself, but also control of the line adapter 70, device diagnosis device 72, device information collecting device 73 and operation screen 74.

The device diagnosis device 72 performs self diagnosis of the device, and transmits the result of the diagnosis to the customer support center via the line adapter 70.

The device diagnosis device 72 determines whether the device is in a condition of having a fault, or a condition of not having a fault but needing maintenance. The thus-obtained information is transmitted to the customer support center as fault information or alarm information.

The fault information is information indicating a condition of the device when a result of self diagnosis based on information from sensors provided in the device is that service or maintenance should be made by a staff.

When fault information is transmitted to the customer support center, basically, a service staff is dispatched, and repairs or performs maintenance works on the device.

For example, not only a typical case where the device does not operate, the device has bad condition or deficiencies for operation or the like, but also a case where a user presses an alarm button when problems occur in output images, abnormal sounds occur, or the like is also determined as a case to generate fault information.

The alarm information indicates a condition of not a fault but needing maintenance, and does not indicate urgency in comparison to fault information. By reporting such a condition to the customer support center before fault occurs, the customer support center can perform maintenance works schematically.

For example, in an example of a copier, it is determined to generate alarm information in each of cases where paper jam occurs frequently, a door cover is opened for a long time (this indicating that jammed paper cannot be removed by a user), paper jam remains for a long time (this indicating that jammed paper cannot be removed by a user), paper jam occurs successively, and so forth.

With regard to the 'successive paper jam', more specifically speaking, when paper jam occurs five times in a condition in which, for example, no transfer paper is ejected from the device, regardless of position of the occurrence, including subsequent processing devices, the device diagnosis device 72 determines that successive paper jam occurs, and reports this matter to the customer support center as alarm information.

Further, when neither maintenance nor inspection has been performed for a long period, alarm information is sent to the customer support center. For example, in a case of a copier, when paper feeding rollers have rotated predetermined number of times, they are in such a condition that they easily have faults. Accordingly, when the rollers have rotated a predetermined number of times, this condition is determined so as to generate alarm information.

The above-described information is expressed by information code, and, after being stored in a buffer in the diagnosis device 72, is reported to the customer support center after being inserted into a transmission format.

Figure 9:
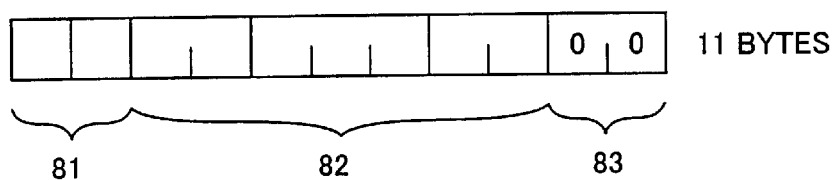
FIG. 9 illustrates one example of an information code according to the present invention.

FIG. 9 shows an example of the information code.

The information code 80 shown in FIG. 9 is of a configuration of 11 bytes, wherein first and second bytes are classification code 81; 3rd through 9th bytes are a mode code (indicating the contents of the information) 82; and 10th and 11th bytes are bytes 83 to be used by the customer support center, and '00' are inserted therein in the device.

For example, information having the first byte of the value '1' is information which can be read only by the customer support center, and is information such as state information of the device, paper jam history, working history, history of the number of copied sheets, or the like.

Information having the first byte of the value '3' is information which is transmitted from the device when repairing or maintenance is needed. Further, Information having the first byte of the value '3' is information which can be read by the customer support center as the need arises even if no information is transmitted from the device. For example, the information is fault information, alarm information or the like.

Based on setting or instructions (inquiry) from the customer support center, the device information collecting device 73 collects usage information and quality information of the device, and transmits the thus-collected information to the customer support center via the line adapter 70.

Fault information is reported to the customer support center immediately when an event occurs and is determined as a fault by the device diagnosis device 72. For a case of alarm information, information which the device diagnosis device 72 has determined as an alarm is once stored in the buffer of the diagnosis device 72, and, after that, is reported the customer support center collectively in a unit of predetermined data amount.

Further, in response to an inquiry from the customer support center, fault information, alarm information, usage information and so forth in the device is transmitted to the customer support center.

The line adapter 70 has a communication function, transmits information of the device to the network, and receives a signal from the network.

Figure 10:
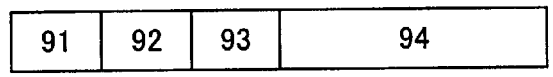
FIG. 10 illustrates one example of a transmission format according to the present invention.

The line adapter 70 transmits fault information, alarm information, usage information and so forth, expressed by the information code described above, to the customer support center after inserting it in the transmission format 80 shown in FIG. 10, for example.

In FIG. 10, the transmission format is configured by ID information 91 of LADP 70, call-type information 92, date-and-time information 93, and information 94 such as fault information, alarm information, usage information and/or the like.

The ID information 91 of LADP 70 is, for example, the model and/or substrate information of the LADP 70, call-type information 92 is, for example, information of test, price, contents to be called or the like, the date-and-time information 93 is, for example, clock information of the LADP 70.

The LADP 70 transmits a plurality of pieces of information of the device. Therefore, a plurality of pieces of information such as fault information, alarm information, usage information and/or the like are inserted into the information 94 of fault information, alarm information, usage information and/or the like expressed by the above-mentioned code information, together with the ID information of the device.

The operation screen 74 is used for operating the device and displaying the state of the device.

The device is separated into modules, and it is possible to collect usage information and state information for each module.

A state display button 75 is provided on the device for displaying the state of the device, and when this button is pressed, the information indicating the state of the device is transmitted from the customer support center, and thereby, the state of the device can be displayed on the operation screen 74.

The information indicating the state of the device may include, for example, the amount of working of the device, the duration of working of each module of the device, occurrence of fault and/or alarm, and so forth.

Such information may be printed out by the device.

The supply box provided in the device 1 will now be described.

The supply box 111 has a supply A, a supply B, a holding state determining part 114 and a network interface part 113.

The supply box 111 is a container which previously holds a predetermined amount of expendable supplies for the device 1 which the customer uses, and is provided for each customer appropriately.

For example, when the device 1 which the customer uses is an electrophotographic printer, n sets ($A_1$ through $A_n$) of toner cartridges (supply A) suitable for the printer, m sheets ($B_1$ through $B_m$) of special paper (supply B) suitable for the printer are held by the supply box 111.

In the supply box 111, the numbers of remaining sets and sheets of those expendable supplies or the used amounts thereof are detected by detecting parts $112_A$ and $112_B$, respectively. Then, based on the detection results of the detecting parts $112_A$ and $112_B$, the holding state determining part 114 compares them with threshold values predetermined for the supply A and supply B, respectively, and catches the holding states of the expendable supplies.

For example, when the detected number of the remaining sets of the supply A is lower than the predetermined threshold value, the holding state determining part 114 generates supply instructing data for the supply A, which is then transmitted to the customer support center 11 via the network interface part 113 provided in the supply box 111 and the LAPD 70 of the device. 1.

In FIG. 6, a configuration is made such that the network interface part 113 of the supply box 111 is connected to the LAPD 70, and supply instructing information is transmitted via the LAPD 70. However, it is also possible to make a configuration such that the network interface part 113 of the supply box 111 is directly connected to the network 110, and supply instructing data is transmitted to the customer support center 11 in this route.

Further, the holding state determining part 114 may be provided for each of the supply A and supply B, or may be provided in common for the supply A and supply B. Alternately, the holding state determining part 114 may be provided for each of the supply A and supply B, and in each of the sensor parts $112_A$ and $112_B$.

As a result of the customer support center according to the present invention using such supply boxes, for example, a manufacturer of the device provides the supply boxes, free of charge, to the customers who wish them, then, based on the supply instructing data received by the manufacturer at the customer support center 11, the manufacturer charges the customers for the expendable supplies, and, It is thereby possible to avoid a situation such that a lack of necessary expendable supplies occurs in using the device, and appropriate charging for the used amount of the expendable supplies is made.

The customer information system in charge of maintenance and management of the device, receiving the used-amount information and quality information from the customer support center 11, processes the received information, and performs maintenance, inspection and/or repairing of the device. At this time, as need arises, the customer information system dispatches a service staff.

Figure 7:
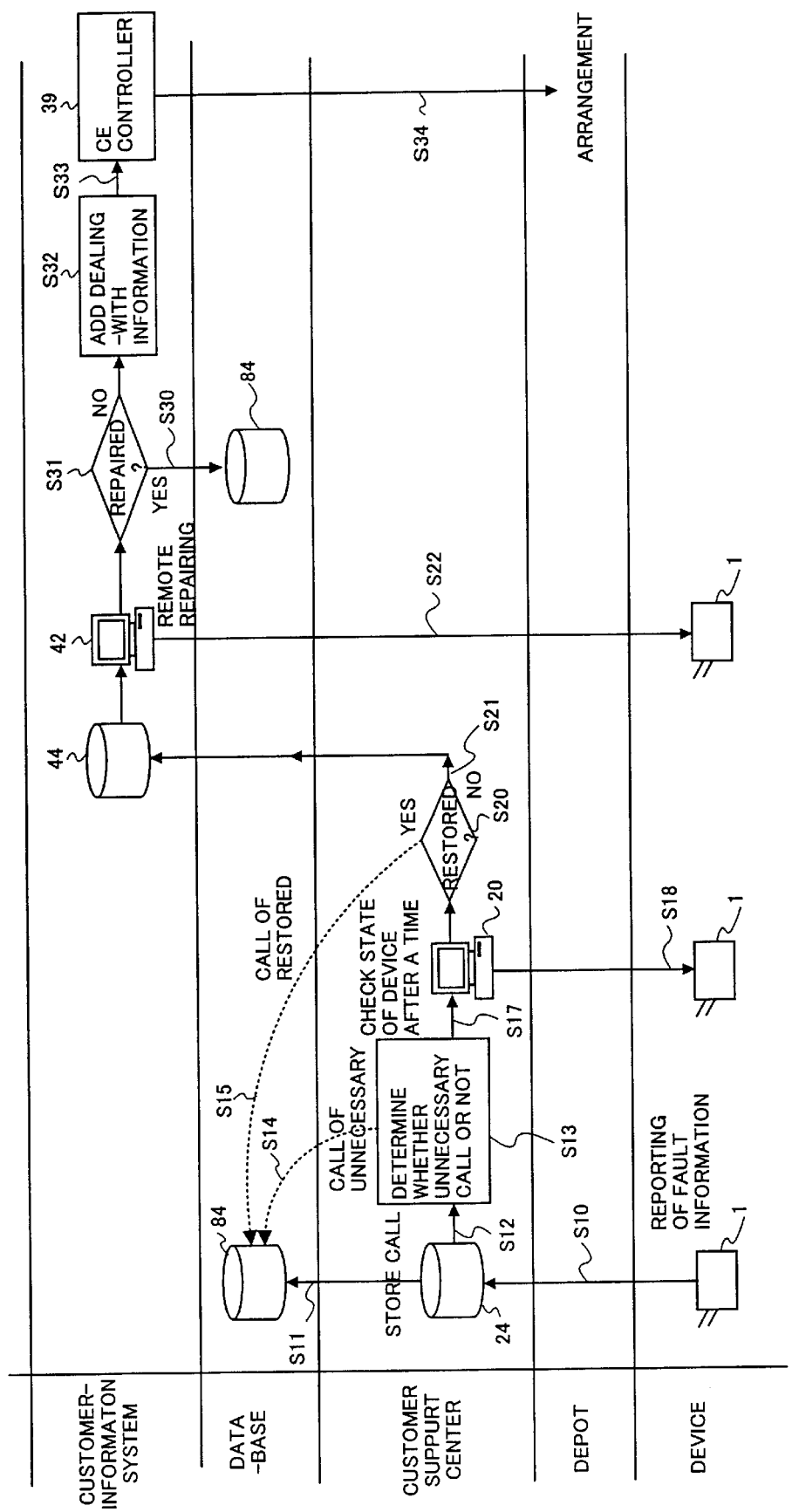
FIG. 7 illustrates one example of a processing procedure in each system in a case where fault information is generated, according to the present invention.

With reference to FIG. 7, an example of a processing procedure executed by the customer support center 11 and customer information system in a case where fault information is generated from the device located at the customer will now be described.

At a time of occurrence of a fault, the following steps are executed.

The device 1 located at the customer generates fault information to the customer support center, when a fault occurs (in a step S10). The customer support center 11 receives this information through the communication server 21 shown in FIG. 3, and stores this information in the database 24 shown in FIG. 3. Also, this fault information (call information) is stored in a higher-rank database 84. If there is no such a higher-rank database, the database 24 also acts as the higher-rank database 84. Further, it is also possible to provide the higher-rank database 84 in the customer support center in addition to the database 24.

The customer support center 11 executes the following processing.

It is determined by the fault reporting server 26 of the customer support center 1 whether or not the fault information from the device 1 located at the customer is an unnecessary call (in a step S13). The unnecessary call is fault information received to be discarded, not treated as fault information, or filtered by the fault information/alarm information discarding program 102, fault information non-treating program 103 or filtering program 104.

When it is an unnecessary call, appendix information indicating that the fault information is an unnecessary call (or that it is discard, that it is not treated as fault information, or that it is filtered) is added to the above-mentioned fault information. When it is not an unnecessary call, quality information is obtained from the device 1 located at the customer (in a step S18) after a predetermined time has elapsed since the fault information is received. Based on the obtained quality information, it is determined whether or not the device is restored from the fault (in a step S20). When it is restored from the fault, information indicating that the device is restored from the fault is added to the above-mentioned fault information (in a step S15). However, when it is not restored from the fault, the fault information is transmitted to the customer information system in charge of maintenance and/or management of the device (in a step S21).

The customer information system in charge of the maintenance and management of the device will execute the following processing.

The customer information system in charge of maintenance and/or management of the device records this fault information in the database 44 via the network 10 and router 41 shown in FIG. 4. Then, through the terminal 42 for management of this customer information system, remote repairing of the relevant device 1 located at the customer is tried (in a step S22). As a result, when the device is restored from the fault, information indicating this restoration is added to the above-mentioned fault information (in a step S30). However, when it is not restored from the fault, information indicating suitable measures to be taken is added to the above-mentioned fault information (in a step S32), and the thus-obtained information is transmitted to a customer engineer (CE) controller 39 (in a step S33). The customer engineer controller 39 calls a service (maintenance) staff (in a step S34).

Main customer supporting methods according to the present invention will now be described.

(1) The customer support center performs collection and delivery of usage information indicating an amount to which the device is used and quality information indicating the quality of the device, and, also, the customer support center stores part or all of the usage information and quality information. Further, the customer information systems use the usage information and quality information so as to support the customers.

For example, previously the customer support center manually or under control by the system management server 22, sets targets for which, time at which or states in which the information is to be collected for the device, in the device information collecting device 73 of each device located at the customer, through the installation work server 32, remote information collection server 27 and/or the like.

Then, the customer support center obtains information from the device located at the customers through the communication server 21 according to control by the system management server 22.

The thus-obtained information is used by the fault reporting server 26, remote information collection server 27, supply reporting server 28, alarm management server 29, counter obtaining server 30, communication device fault dealing-with server 31 and information modification and distribution server 33.

The fault reporting server 26, remote information collection server 27, supply reporting server 28, alarm management server 29, counter obtaining server 30, communication device fault dealing-with server 31 and information modification and distribution server 33 modify the information, and transfer the information to the customer information systems as the need arises.

Then, the customer support center stores the thus-modified information for each device or each customer in the database 24.

(2) The customer information system in charge of sales of the device obtains information of sales device for each function and for each size, and the usage information for a specific customer, and provides information of device suitable for the customer using the thus-obtained information of sales device for each function and for each size, and usage information for the specific customer, and conditions indicated by the specific customer.

For example, when a customer uses paper having a specific size, a device which has a cassette having the size installed at the top is proposed. For a customer who takes a plurality of photocopies from one original, a device having a sorter is proposed. For a customer who frequently uses paper having a size different from those of the present cassettes (by hand feeding), it is proposed to add a paper cassette.

Furthermore, from a manner in which a customer actually used the device, is proposed to add optional facilities, or a device having a suitable copy volume (durability) is proposed.

When such information concerning the device is provided to a customer, conditions of the customer and reasons thereof are indicated thereto simultaneously.

Such operation may be performed at a house of the customer using a mobile terminal through communication with the customer information system via a communication line.

Accordingly, it is possible to select a subsequent device according to the conditions and use situation of the customer. It is thereby possible to select a very suitable next device.

Further, it is possible to prepare a proposal rapidly and appropriately for the customer.

(3) The customer information system in charge of maintenance and/or management of the device, when receiving fault information from the customer support center, restores the device located at the customer by changing setting of the device remotely.

For example, at a time of paper jam, the paper jam is got rid off as a result of a pressure of air by which paper is conveyed in the device being changed remotely.

Further, a fault is got rid off through remote change of set values of the device or remote change of version of a software installed in the device.

(4) Further, the customer information system in charge of maintenance and/or management of the device, receiving usage information and quality information from the customer support center, processes the thus-received information, and thus, performs diagnosis of the device periodically.

For example, a history of whether a fault occurred during a period from a last visit of a service staff to a this-time visit is obtained. Further, a history of whether report of prediction of a fault was issued is obtained. Furthermore, it is determined whether each parameter falls within a safety range when state information of the device is checked at a time of diagnosis.

Further, as the need arises, the customer information system in charge of maintenance and/or management of the device uses rich usage information and quality information, and performs diagnosis of the device periodically, through the customer support center.

When a fault or a near-future fault is predicted from the result of the diagnosis, renewal of a relevant module may be proposed in a case where the predicted fault is relevant to the module. Alternatively, a service staff is dispatched.

(5) The customer information system in charge of maintenance and/or management of the device, receiving usage information and quality information from the customer support center, performs quality control of maintenance and/or management works.

For example, when determining from remote inspection using usage information and quality information that actual inspection is needed, the system makes an arrangement of a service staff for the inspection. Also in a case where it is determined from usage information (for example, from the number of photocopying operations already performed) that expendable supplies are short, the system makes an arrangement of a service staff for inspection.

Further, after dispatch of a service staff, the system inspects the state of the device, and determines whether restoration has been completely made.

(6) The customer information system in charge of maintenance and/or management of the device, although not shown in the figures, has a database of artificial intelligence, and, based on knowledge data of the artificial intelligence and information obtained from the customer support center, determines whether the device of the customers have faults.

The knowledge data of the artificial intelligence may include characteristics of components for each model, statistical data concerning dealing with faults, correlation data of causes of occurrences of faults, history of maintenance of the device, and so forth. Thereby, an expert system is constructed in the server, and is used for supporting the customer.

Such a fault diagnosis is performed empirically through analysis of parameters of causes of faults. Further, the thus-obtained experiences are used as effective information, a database is formed thereof, and is used for fault diagnosis.

(7) The customer information system in charge of supply of expendable supplies of the device, receiving usage information from the customer support center, performs management of ordering of expendable supplies and inventory management therefor.

For example, in the center, predictive management of amounts of stock in the customers is performed. When a predetermine amount of expendable supplies has been used in the customer, the center receives a report of this matter, and reduces a predictive stock. Then, when the predictive stock becomes lower than an ordering point, ordering or ordering information is sent to a sales department automatically. Also, information of inventory (stocktaking) is obtained from the site, and thereby, the predictive stock is adjusted.

(8) The customer information system in charge of supply of expendable supplies of the device obtains information of stock of expendable supplies of the device before a holiday (according to the above-mentioned holiday information) by a predetermined time.

For example, stock of expendable supplies of the device is inspected on Thursday, and, when the stock is short, supply of expendable supplies is arranged at the time.

Thereby, lack of stock is prevented from occurring on the weekend.

(9) The customer information system in charge of supply of expendable supplies of the device obtains information of stock of expendable supplies, and, when the amount of stock is smaller than a predetermine amount, orders the relevant expendable supplies on behalf of the customer as if the customer has ordered them.

(10) The customer information system in charge of planning of device, receiving usage information and quality information from the customer support center, understands the actual situation as to how the device are used, and makes planning of next device.

For example, functions which have not been used frequently are removed from next device. Further, functions which have been used frequently by a specific echelon are enriched in next device for the echelon.

(11) The customer information system in charge of design of the device, receiving usage information and quality information from the customer support center, obtains quality information for each generation, for each model, and for each device, and achieves improvement of quality of the device.

For example, the system catches tendency and frequency of faults for each model, the system timely performs improvement or design change on market products.

(12) The customer information system in charge of manufacturing of the device, receiving usage information and quality information from the customer support center, recognizes the lives of the device, the durability of components, and makes the quality control in the manufacturing department be congruent with the actual situation.

For example, when previously assumed lives of the device and durability of the components are different from the actual values in the market products, improvement of components and so forth, reexamination of maintenance intervals, and so forth are performed.

Although the customer support center and the customer information systems are described separately, it is also possible to integrate the customer support center and one or some or all of the customer information systems into one system.

Further, it is also possible that the customer support center may perform part of the function(s) of one or some or all of the customer information systems.

Further, it is possible that some or all of the customer information systems are integrated into one system.

The customer information systems may be used by remote terminal(s) via a network.

Thus, according to the present invention, information of device located at customers is collected through a wide range, and, also, by using usage information and quality information of the device and customer information, various conveniences/advantages are given to the customers. It is thereby possible to positively support the customers.

Further, it is possible to deal with faults of the device rapidly, and to improve efficiency in using the device.

It is possible to obtain proper alarm information before the device actually has a fault. Thereby, to prevent the fault of the device before it occurs.

Supply of expendable supplies can be made without delay, and it is possible to prevent such a situation that the device cannot be used due to lack of expendable supplies.

Because monitoring of the device can be performed accurately, it is possible to prevent useless diagnosis and/or maintenance from being performed.

Because it is possible to deal with faults/alarms of the device remotely, it is possible to deal with the faults/alarms rapidly, inexpensively.

Further, because it is possible to select next device according to conditions of the customers and situations in using of the device, it is possible to select suitable device.

Further, it is possible to prepare proposal appropriately and timely for the customer.

Further, a planning department, a design department and a manufacturing department, which cannot obtain data of situations as to how the device are actually used, can obtain rich data of situations as to how the device are actually used. It is thereby possible to perform apt planning, design, quality control, and so forth.

The present invention is not limited to the above-described embodiments, and variations and modifications may be made without departing from the scope of the present invention.

The present application is based on Japanese priority application No. 11-375652, filed on Dec. 28, 1999, the entire contents of which are hereby incorporated by reference.

What is claimed is:

1. A customer supporting system utilizing information concerning at least one apparatus placed at a customer and supporting the customer, comprising:

a customer supporting center collecting customer information using a communication line, and storing or transferring the information; and at least one customer-information utilization system connected with said customer supporting center via a communication line, utilizing the information from said customer supporting center, and supporting the customer, wherein said customer supporting center comprises a collection and delivery part collecting and distributing used-amount information and quality information of said at least one apparatus, the used-amount information indicating real customer usage of the apparatus and the quality information indicating a real state or condition of the apparatus, and an apparatus information storing part storing the used-amount information and quality information as it is or after modifying it; and said customer-information utilization system utilizes the used-amount information and quality information collected by said customer supporting center, and supports the customer.

2. The system of claim 1, wherein:

the quality information comprises alarm information indicating that the at least one device requires maintenance although no fault has occurred, and the usage information comprises information indicating how many times the at least one device is used.

3. The system of claim 2, wherein:

the customer support center, when receiving the fault information, reports this matter to a customer information system in charge of maintenance and/or management of the device, and, the customer support center obtains the quality information of the device which has the fault, after a predetermined time has elapsed since the fault information was received, and comprises a canceling component for canceling the fault information when it is determined from the quality information that the device operates normally.

4. The system of claim 2, wherein the customer support center comprises a discarding program which discards the fault information or alarm information when it is determined from a condition of the device that the device is in a condition such that no fault or no bad condition or deficiency occurs, when the fault information or alarm information is received.

5. The system of claim 2, wherein the customer support center, when receiving the fault information, regards it as non-fault information that is not necessary to deal with.

6. The system of claim 5, wherein the customer support center comprises a prediction program for predicting a future fault or bad condition or deficiency using the non-fault information.

7. The system of claim 5, wherein the customer support center comprises a prediction part for predicting a future fault or bad condition or deficiency using the non-fault information.

8. The system of claim 2, wherein the customer support center comprises a filter program for deleting from the fault information that information which is unnecessary to restore the device from a fault.

9. The system of claim 8, wherein the customer support center comprises a prediction program for predicting a future fault or bad condition or deficiency using information which is deleted from the fault information by the filter program.

10. The system of claim 2, wherein the customer support center identifies alarm information as fault information when the alarm information is received from the same device successively.

11. The system of claim 2, wherein the customer support center comprises a transferring program which, when alarm information is received, transfers the alarm information to the customer information system in charge of maintenance and/or management of the device.

12. The system of claim 2, wherein the customer support center comprises a transferring program which modifies the alarm information and transfers the modified alarm information to the customer information system in charge of maintenance and/or management of the device.

13. The system of claim 2, wherein the customer information system in charge of maintenance and/or management of the device, when information as to how many times the device is used changes sharply, determines whether this value is abnormal.

14. The system of claim 2, wherein the customer support center comprises a discarding part which discards the fault information or alarm information when it is determined from a condition of the device that the device is in a condition such that no fault or no bad condition or deficiency occurs, when the fault information or alarm information is received.

15. The system of claim 2, wherein the customer support center comprises a filter part for deleting from the fault information that information which is unnecessary to restore the device from a fault.

16. The system of claim 15, wherein the customer support center comprises a prediction part for predicting a future fault or bad condition or deficiency using information which is deleted from the fault information by the filter part.

17. The system of claim 2, wherein the customer support center comprises a transferring part which, when alarm information is received, transfers the alarm information to the customer information system in charge of maintenance and/or management of the device.

18. The system of claim 2, wherein the customer support center comprises a transferring part which modifies the alarm information and transfers the modified alarm information to the customer information system in charge of maintenance and/or management of the device.

19. The system of claim 1, wherein the customer support center comprises an information acquisition setting program for specifying a target device or a time and obtaining information regarding use of the target device.

20. The system of claim 1, wherein the customer support center comprises a supply instructing program using the usage information or expendable-supply used information for supplying expendables to the device, the supply instructing program reporting necessary information to the customer information system in charge of supply of expendables.

21. The system of claim 1, wherein:
the quality information comprises supply instruction information indicating that a supply of expendables is needed,
a supply box is deployed at the customer at which the device is located, and
the supply box comprises a transmitting program which captures a custody state of expendables for each item of the expendables, and, when supply of the expendables is needed, transmits supply instruction information to the customer support center.

22. The system of claim 1, wherein the customer support center comprises a storage program storing, for each device or for each customer, information received by the customer support center and information obtained after being modified by the customer support center.

23. The system of claim 2, wherein the customer information system in charge of maintenance and/or management of the device, when receiving the fault information from the customer support center, examines the state of the device located at the customer.

24. The system of claim 23, wherein the customer information system in charge of maintenance and/or management of the device, after confirming based on the quality information of the device located at the customer that the device has a fault, provides instructions to repair the device.

25. The system of claim 23, wherein the customer information system in charge of maintenance and/or management of the device manages progress of the state from the reception of the fault information to the restoration from the fault.

26. The system of claim 1, wherein the customer information system in charge of maintenance and/or management of the device, when the customer information system in charge of supply of expendables generates expendable-supply ordering information, compares the state of the device located at the customer for which the ordering is made with the expendable-supply ordering information, and thus examines this information.

27. The system of claim 1, wherein the customer information system, receiving supply instructions from the customer support center, supplies expendables to the relevant device.

28. The system of claim 1, wherein the customer support center comprises an information acquisition setting part for specifying a target device or a time and obtaining information regarding use of the target device.

29. The system of claim 1, wherein the customer support center comprises a supply instructing part using the usage information or expendable-supply used information for supplying expendables to the device, the supply instructing part reporting necessary information to the customer information system in charge of supply of expendables.

30. The system of claim 1, wherein:
the quality information comprises supply instruction information indicating that a supply of expendables is needed,
a supply box is deployed at the customer at which the device is located, and the supply box comprises a transmitting part which captures a custody state of expendables for each item of the expendables, and, when supply of the expendables is needed, transmits supply instruction information to the customer support center.

31. The system of claim 1, wherein the customer support center comprises a storage part storing, for each device or for each customer, information received by the customer support center and information obtained after being modified by the customer support center.

32. A customer supporting method used by at least one apparatus placed at a customer, a customer supporting center collecting, distributing and/or modifying information of said at least one apparatus using a communication line, and at least one customer-information utilization system connected with said customer supporting center via a communication line and supporting the customer utilizing the information collected and/or modified by said customer supporting center, comprising the steps of:

a) said customer supporting center collecting and distributing used-amount information and quality information of the apparatus, the used-amount information indicating real customer usage of the apparatus and the quality information indicating a real state or condition of the apparatus;

b) said customer supporting center storing part or all of the used-amount information and quality information; and c) said customer-information utilization system utilizes the used-amount information and quality information for supporting the customer.

33. The method of claim 32, wherein:

the customer information system in charge of sales of the device obtains classified-by-function information and classified-by-size information of the sales device, and the usage information of the device for the specific customer, and the customer information system provides information of the device suitable for the customer using the classified-by-function information, classified-by-size information of sales devices, usage information of the specific customer, and a condition indicated by the specific customer.

34. The method of claim 33, wherein when the information of the device is provided to the customer, the condition of the customer and a reason of providing the information are provided to the customer, simultaneously.

35. The method of claim 33, wherein the customer information system is used at a house of the customer through a remote terminal via a communication line.

36. The method of claim 32, wherein, when receiving the fault information or alarm information from the customer support center, the customer information system in charge of maintenance and/or management of the device changes setting of the device located at the customer remotely so as to restore the device.

37. The method of claim 36, wherein the customer information system in charge of maintenance and/or management of the device, when it is not possible to restore the device by changing setting of the device, arranges a person for restoring the device without delay.

38. The method of claim 32, wherein the customer information system in charge of maintenance and/or management of the device, receiving the usage information and quality information from the customer support center, inspects the device by processing the received information periodically.

39. The method of claim 32, wherein the customer information system in charge of maintenance and/or management of the device, receiving the usage information and quality information from the customer support center, performs quality control of the maintenance and/or management works.

40. The method of claim 32, wherein the customer information system in charge of maintenance and/or management of the device has a database of an artificial intelligence, and, based on knowledge data of the artificial intelligence and information obtained from the customer support center, determines whether the device of the customer has a fault.

41. The method of claim 32, wherein the customer information system in charge of supply of expendables, receiving the usage information from the customer support center, supplies and/or manages the expendables.

42. The method of claim 41, wherein the customer information system for managing expendables obtains information of stock of the expendables prior to a holiday by a predetermined time.

43. The method of claim 41, wherein the customer information system for managing expendables obtains information of stock of the expendables, and, when the stock is less than a predetermined amount, orders the relevant expendables on behalf of the customer as if they have been ordered by the customer.

44. The method of claim 32, wherein the customer information system in charge of planning the device, receiving the usage information and quality information from the customer support center, captures the actual situation as to how the device is used, and performs planning of the next device.

45. The method of claim 32, wherein the customer information system in charge of design of the device, receiving the usage information and quality information from the customer support center, obtains the quality information for each generation, for each model, and/or for each device, and improves the quality of the device.

46. The method of claim 32, wherein the customer information system in charge of manufacturing of the device, receiving the usage information and quality information from the customer support center, captures the life of the device and durability of components, and makes quality control in a manufacturing department be congruent with the actual situation.

47. The method of claim 32, wherein part or all of the works performed by the at least one customer information system is performed by the customer support center.

48. A customer supporting center collecting, distributing and/or modifying information of at least one apparatus placed at a customer using a communication line, comprising:

a collection and delivery part collecting and distributing used-amount information and quality information of said at least one apparatus, the used-amount information indicating real customer usage of the apparatus and the quality information indicating a real state or condition of the apparatus; and an apparatus information storage part stores the used-amount information and quality information as it is or after modifying it, wherein said center providing the collected and/or modified information to at least one customer-information utilization system connected to said center via a communication line, and, thereby, information concerning said at least one apparatus is utilized for supporting the customer.

49. A customer-information utilization system connected via a communication line with at least one apparatus placed at a customer and a customer supporting center collecting, distributing and/or modifying information of said at least one apparatus using a communication line, and utilizing the information collected and/or modified by said customer supporting center for supporting the customer, comprising:

a storage part storing the information to be utilized for supporting the customer; and a processing part supporting the customer by utilizing used-amount information and quality information of said at least one apparatus, the used-amount information indicating real customer usage of the apparatus and the quality information indicating a real state or condition of the apparatus, wherein said system utilizes the information concerning said at least one apparatus for supporting the customer individually.

50. An apparatus placed at a customer in a customer supporting system comprising a customer supporting center collecting, distributing and and/or or modifying information of said apparatus using a communication line and at least one customer-information utilization system connected with said customer supporting center via a communication line and supporting the customer utilizing the information collected and/or modified by said customer supporting center, comprising:

an operation screen used for operating said apparatus; and a state displaying button for displaying the state of said apparatus, wherein when said button is pressed, said customer supporting center transmits information indicating the state of said apparatus, and the state of said apparatus is displayed on said operation screen and wherein said customer supporting center comprises a collection and delivery part collecting and distributing used-amount information and quality information of said apparatus, the used-amount information indicating real customer usage of the apparatus and the quality information indicating a real state or condition of the apparatus.

51. A customer support center collecting, distributing and/or modifying information of at least one device located at a customer using a communication line, comprising:

a collection and delivery part collecting and distributing usage information and quality information of the at least one device, and a device information storage part stores the usage information and quality information as it is or after modifying it, wherein the center providing the collected and/or modified information to at least one customer information system connected to the center via a communication line, and, thereby, information concerning the at least one device is used for supporting the customer.

52. A customer information system connected via a communication line with at least one device located at a customer and a customer support center collecting, distributing and/or modifying information of the at least one device using a communication line, and using the information collected and/or modified by the customer support center for supporting the customer, comprising:

a storage part storing the information to be used for supporting the customer, and a processing part supporting the customer by using usage information and quality information of the at least one device, wherein the system uses the information concerning the at least one device for supporting the customer individually.

* * * * *